United States Patent [19]

Brown

[11] 3,723,856

[45] Mar. 27, 1973

[54] CROSSED-COIL NUCLEAR MAGNETISM WELL LOGGING APPARATUS AND METHOD UTILIZING A POLARIZING FIELD AND AN ADDITIONAL POLARIZING FIELD TO SHIFT THE DIRECTION OF POLARIZATION

[75] Inventor: Robert J. S. Brown, Fullerton, Calif.

[73] Assignee: Chevron Research Company, San Francisco, Calif.

[22] Filed: Apr. 9, 1971

[21] Appl. No.: 132,716

[52] U.S. Cl. .............................. 324/0.5 G, 324/0.5 R
[51] Int. Cl. .............................................. G01n 33/08
[58] Field of Search ......................... 324/0.5 R, 0.5 G

[56] References Cited

UNITED STATES PATENTS 3,213,357  10/1965  Brown et al. ........................ 324/0.5 R
3,483,465  12/1969  Baker, Jr. ............................. 324/0.5 G

*Primary Examiner*—Robert J. Corcoran
*Attorney*—J. A. Buchanan, Jr., G. F. Magdeburger, R. L. Freeland, Jr. and H. D. Messner

[57] ABSTRACT

A crossed-coil nuclear magnetism well logging apparatus and method is designed to function efficiently at magnetically equatorial regions of the world, as for example in Venezuela, and in slanted boreholes where the earth's magnetic field is substantially perpendicular to the axis of the borehole. When a polarization field $H_p$ is established in the earth formation, the protons of the formation fluids can acquire nuclear magnetism polarization M. After the occurrence of a predetermined polarizing period, $T_{pc}$, the polarizing field $H_p$ is removed in the presence of a rather weak polarizing field, Hl, (generated by passing a polarizing current through the receiving coil) at a select decay rate, i.e., adiabatically, not rapidly, so that the directions of the nuclear magnetic polarization M can be angularly and adiabatically shifted to new directions prior to precession about the earth's field. In order to provide adiabatic shifting of the polarization M, the resultant magnetic field $H_r$ formed between the collapsing polarizing $H_p$ and Hl fields must rotate at a rate that is small compared to the Larmor frequency of the protons in the $H_r$ field.

12 Claims, 10 Drawing Figures

Patented March 27, 1973  3,723,856

INVENTOR
ROBERT J. S. BROWN
BY
ATTORNEYS

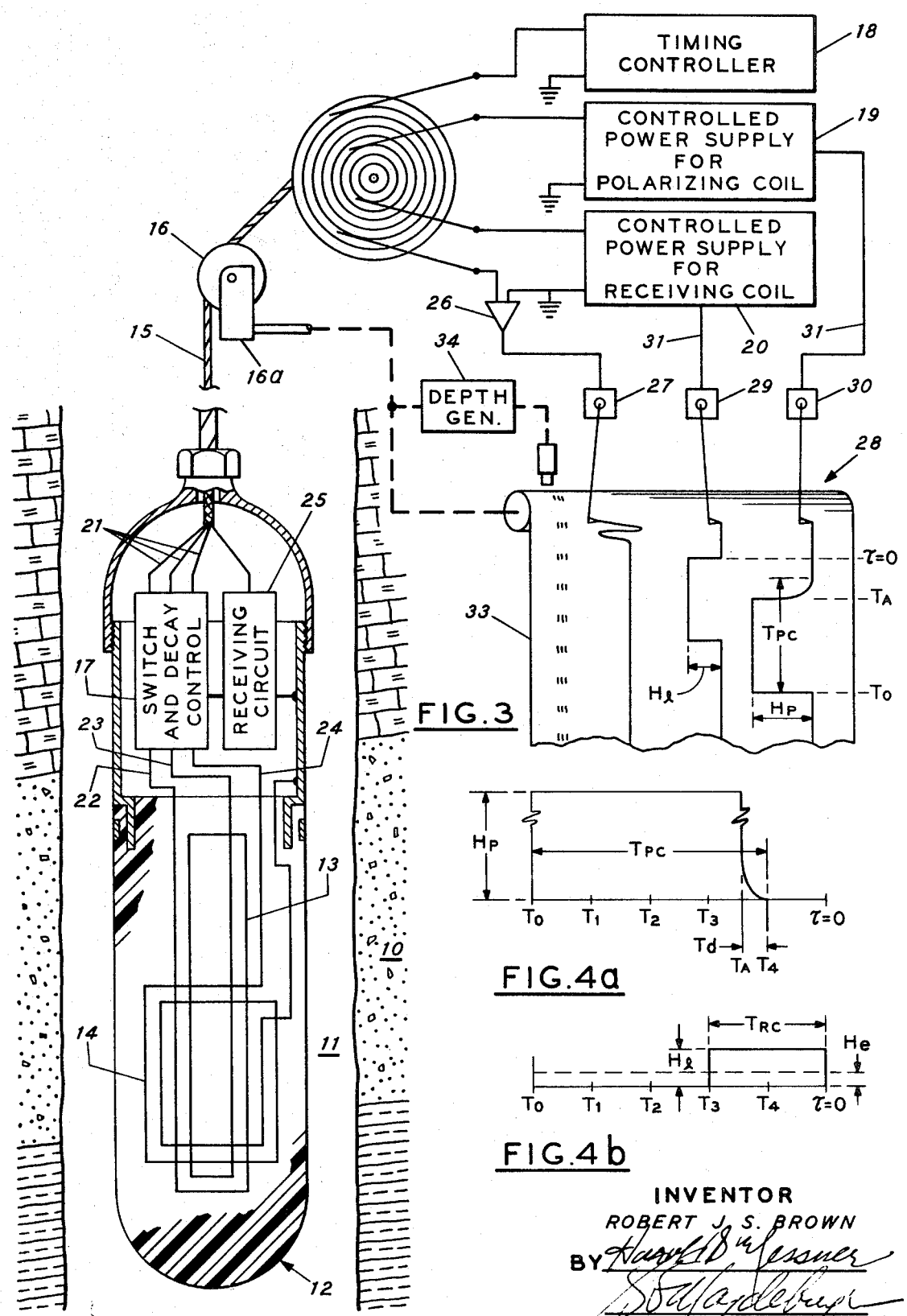

Patented March 27, 1973

INVENTOR
ROBERT J. S. BROWN
BY
ATTORNEYS

CROSSED-COIL NUCLEAR MAGNETISM WELL LOGGING APPARATUS AND METHOD UTILIZING A POLARIZING FIELD AND AN ADDITIONAL POLARIZING FIELD TO SHIFT THE DIRECTION OF POLARIZATION

FIELD OF THE INVENTION

The present invention relates to an improved nuclear magnetism well logging apparatus and method and, more particularly, to a crossed-coil nuclear magnetism well logging apparatus and method which operates effectively when the steady state magnetic field is perpendicular to the axis of the wellbore. In accordance with the apparatus aspects of this invention, interrupt and current control means are connected to polarizing and receiving coils of the nuclear magnetism well logging apparatus to establish two magnetic fields in the formation, $H_p$ and $H_l$ fields associated with a resultant magnetic field $H_r$ whose direction is controllably shifted, rotated, to force the polarization M associated with protons of the hydrogen atoms of formation fluids to new directions prior to precession about the earth's field. The $H_l$ field is generated by passing a weak current through the receiving coil after disconnection of proton precession detection circuitry means therefrom, has occurred. In accordance with the method aspects of the present invention, the shifting of the polarization M occurs at a rather low angular rate ("adiabatically") compared to the Larmor frequency of proton precession within the $H_r$ field by controlling the rate of collapse of the $H_p$ field in the presence of the $H_l$ field. The magnitude of the weak $H_l$ field is larger than the earth's field but much less than that of the polarizing field $H_p$ prior to cut-off.

BACKGROUND OF THE INVENTION

Nuclear magnetism well logging can aid in (i) determining the free fluid content and fluid permeability of earth formations by distinguishing between precessing protons and un-precessing protons as well as (ii) differentiating between water and oil accumulations surrounding the exploratory borehole. In detecting fluids in earth formations, a logging sonde is usually placed within a wellbore penetrating the formation at a predetermined depth. As the sonde is placed adjacent to particular portions of the borehole, nuclear magnetism signals are generated and detected from fluids in and around the borehole. In establishing and detecting the nuclear magnetism signals, the protons of the hydrogen atoms of the fluids — either water or hydrocarbons — are first aligned with the strong polarizing field and then are permitted to relax towards alignment with the second field, usually the earth's magnetic field. The protons act as small gyroscopes and process about the direction of the second field. The precessing of the protons establishes a rotating magnetic field detectable by a receiving coil through generation of an AC-voltage signal. This signal is transmitted to the recording device at the surface of the earth. Relaxation of the protons can be measured from the resulting wave form of the transmitted signal or from the envelope of a series of such signals.

In the nuclear magnetism logging apparatus, a single coil can be used, on a time-share basis, as the polarizing and as the receiving coil. Alternatively, separate polarizing and receiving coils may also be used. When separate coils are used, more often than not, each coil is constructed using a single length of wire wound into a series of turns elongated along the borehole axis; each coil is orthogonally positioned with respect to the other coil so that they are substantially magnetically uncoupled during operation. Such cross-coiled systems possess several significant advantages:

1. Low mutual impedence between coils greatly reduces voltage surge in the receiving circuit at the time the polarizing current is cut off;
2. Construction can be simpler where the polarizing coil is designed to be longer than the receiving coil to permit full polarization opposite longitudinal segments of the formation prior to arrival of the receiving coil at substantial logging speeds as for example described and claimed in U.S. Pat. No. 3,402,343 for "High Speed, High Resolution, Nuclear Magnetism Well Logging Apparatus Having a Plurality of Receiving Coils", assigned to the assignee of the present invention;
3. Since the polarizing receiving coils are separate, it is possible to construct them with differing characteristics. For example, it is desirable that receiving coils have a high Q and a high self-resonant frequency while a polarizing coil should have a low electrical resistance and a high thermal conductivity. With separate coils, these optimum characteristics can be obtained.

Although crossed-coils have significant advantages, experience has shown that they possess, inter alia, several disadvantages. For example, when the earth's magnetic field is perpendicular to the axis of the logging sonde, i.e., where the earth's magnetic field is perpendicular to the borehole to be logged, as in magnetically-equatorial regions of the world such as found in Venezuela, or in regions where slant boreholes produce the same effect, logging results may be of extremely poor quality or more often, nonexistent. It is believed that the crossed orientation of the polarizing and receiving coils with respect to the direction of the earth's field, contributes significantly to the occurrence of such results.

OBJECT OF THE INVENTION

It is, therefore, an object of this invention to provide a novel nuclear magnetism crossed-coil logging apparatus and method capable of effective operation in field environments in which the earth's magnetic field may be essentially perpendicular to the axis of the exploratory borehole.

SUMMARY OF THE INVENTION

In accordance with the present invention, nuclear magnetism logging is permitted to be conducted even when the steady state magnetic field is perpendicular to the axis of the borehole in which the logging sonde is positioned. After polarizing field $H_p$ is established in the earth formation whereby protons of formation fluids acquire a nuclear magnetic polarization M, the present invention provides for the angular rotation, prior to precession, of the polarization M to new directions within the formation so that it appears to have been generated by the receiving coil, not the polarizing coil. The angular shift of the polarization M is accomplished by establishing a rather weak magnetic field $H_l$ in the receiving coil immediately before the polarizing field $H_p$ is cut off through interrupt and current control means serially connected between the receiving and polarizing coils and a source of electrical current. The rate of collapse of the polarizing field $H_p$ in the presence of the $H_t$ field should be adiabatic in the sense that the angular shift rate of the polarization M must be small compared to the Larmor frequency of precession of the protons with the $H_r$ field. Usually the $H_t$ field has a field strength on the order of one-tenth the strength of $H_p$ to permit the rotation of the polarizing M to be slow compared to the Larmor frequency of precession of the protons within the $H_t$ field. The $H_t$ field is maintained until after the $H_p$ field is cut off, then the receiving coil is disconnected from the current source and connected to a proton precessional detection means where an AC-voltage is induced in the coil by the precessing polarization M.

BRIEF DESCRIPTION OF THE DRAWINGS

FIG. 3 is a partially schematic diagram illustrating the crossed-coil system of the present invention for providing effective operations in the field environments depicted in FIGS. 1 and 2;

FIGS. 4a and 4b depict informational diagrams illustrating basic current-time waveforms useful in obtaining desired magnetic field values in accordance with the present invention;

PHYSICAL PRINCIPLES OF NUCLEAR MAGNETISM WELL LOGGING

Figure 1:
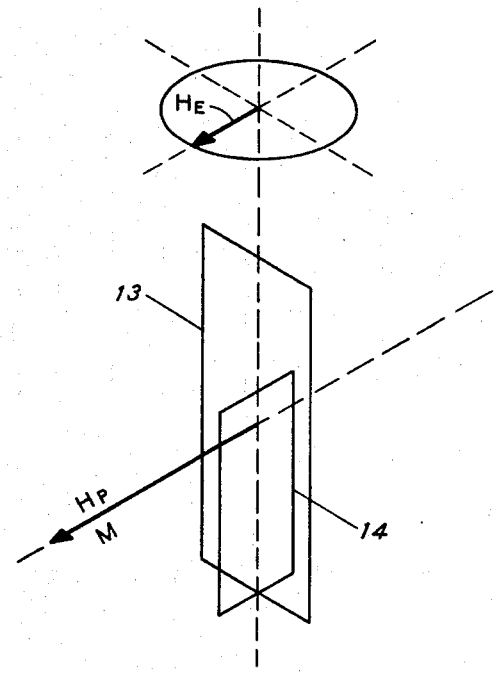
FIG. 1 is a schematic diagram of a conventional cross-coiled nuclear magnetism logging system including separate polarizing and receiving coils in operation in a field environment in which the earth's magnetic field $H_e$ is perpendicular to both the axis of the borehole and the plane of the polarizing coil, illustrating vector directions of a polarizing field $H_p$ and a polarization M. Origins of the vectors has been arbitrarily chosen to coincide with the geometric center of the polarizing coil. It should be realized that the $H_p$ and M vectors associated with other points in the formation will have characteristics dictated by the pattern of flux lines existing for such points.

In order to explain the invention, an explanation of a few of the principles involved in nuclear magnetism well logging is believed to be in order. A more extended treatment can be found in several text books and review articles in scientific journals, the treatment that follows merely states operating facts without producing proofs and omits many important features not of interest in the explanation of the operations of the present invention.

A large number of atomic nuclei have angular momentum that is, in accordance with well known laws of quantum mechanics, equal to an integer or half-integer multiple of Planck's constant $h$ divided by $2\pi$, symbolized by $\hbar$. I is called the nuclear spin; it may have the value of 0, ½, 1, 3/2, etc. A particular species of nucleus never changes its spin. Most nuclei with a non-zero spin would have an invariant magnetic dipole moment denoted by $\mu$. The only known relation between angular momentum and the dipole moment is that the two, as quantities oriented in space, are always parallel to each other. The ratio between the two quantities, $\gamma=\mu/I$ is called the gyromagnetic ratio (sometimes called the magnetogyric ratio).

When a system such as a quantity of a gas, a liquid or a solid containing one specie of nucleus with a spin different from zero is placed in a magnetic field H it acquires a nuclear magnetization. It takes a finite time before a state of thermal equilibrium is established, but once the thermal equilibrium is reached, the magnetization remains stationary so long as the magnetic field under the physical parameters such as temperature and pressure of the system are kept constant. Before this state is reached, and from the moment at which the magnetic field is established, the nuclear magnetization and therefore also the angular momentum, experiences a motion which can be described such as precession influenced by forces of friction. The phenomenon that is caused by the forces of friction and by which a system is enabled to approach thermal equilibrium, is called relaxation.

By precession is meant there is a motion in which a quantity, such as angular momentum, remains constant in magnitude and changes its direction in space in such a manner that describes a cone of constant angular velocity. The axis of this cone is parallel to the direction of the magnetic field H; the vertex angle of the cone depends on the state of affairs prior to the time at which the field was switched on, and the angular frequency $\omega$, which is called the Larmor frequency. The Larmor frequency is equal to $\gamma H^*$ where $H^*$ is the magnetic field at the nucleus. $H^*$ and H are nearly equal but nearby electrons cause a slight difference due to magnetic screening.

During a precessional motion, at least during a time short compared to the relaxation time, the component of the angular momentum and therefore also the magnetization, in the direction of the field, is constant in magnitude. The component perpendicular to the field is also constant in magnitude but not in direction; it rotates with an angular frequency $\omega$. The influence of the frictional forces is to diminish the perpendicular component until it becomes zero and to change the parallel component until it reaches a stationary value. In terms of nuclear polization, M, the component $M_1$ (the component of M perpendicular to the field), is seen to be zero after relaxation has been achieved, while the parallel component $M_2$ is equal, in the relaxed state, to ($\frac{1}{3}$) ($N\mu/K\theta$)($I+1$)/$I$ where N is the number of nuclei per unit volume of the species considered, $\theta$ is the absolute temperature in degrees Kelvin and K is Boltzmann's constant. From the waveform of such signal, or from the envelope of a series of such signals, relaxation times as well as other important logging information, can be determined.

DESCRIPTION OF A PREFERRED EMBODIMENT

Figure 2:
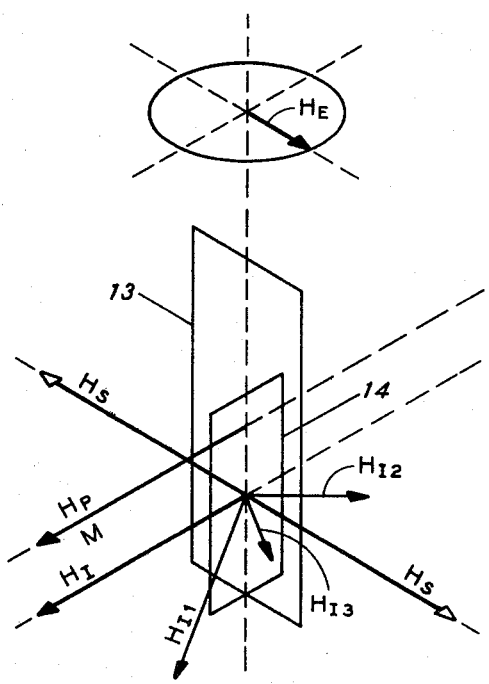
FIG. 2 is a schematic diagram of a conventional crossed-coil nuclear magnetism logging system in operation in a field environment in which the earth's magnetic field $H_e$ is perpendicular to the borehole and perpendicular to the plane of the receiving coil, illustrating again vector directions of a polarizing field $H_p$ and a magnetic field $H_t$ induced by the polarization M, as well as a vector associated with maximum sensitivity vector $H_s$ of the receiving coil.

Reference is now made to FIG. 1. In schematic form, a conventional nuclear magnetism logging apparatus is depicted as comprising cross-oriented polarizing and receiving coils 13 and 14. The earth's magnetic field $H_e$ is perpendicular to the longitudinal axes of the crossed coils and orthogonal to the plane of the polarizing coil 13 as, e.g., would be found in magnetically equatorial regions of the world, such as Venezuela, or in a slanted borehole suffering from the same field effect. Passing a current through coil 13 generates a polarizing field $H_p$ which in turn causes the protons of fluids to acquire a nuclear magnetic polarization M in the direction indicated. These vectors are seen to be centered at the geometric center of polarizing coil 13 coincident with its magnetic axis for the reason previously set forth. When the polarizing field $H_p$ is cut off, there are substantial numbers of protons in the formation (those aligned in the direction shown) that will not precess about the $H_e$ field since they are already aligned with that field. Hence, little information concerning the character of the formations will be obtained. Where the earth's magnetic field $H_e$ is substantially parallel to the polarizing field, the motion of the protons about the $H_e$ field produces an induced field $H_I$ which rotates, with time, also about the $H_e$ field in the direction indicated by vectors $H_{I1}$, $H_{I2}$, and $H_{I3}$ of FIG. 2. Due to orientation of the $H_1$ vector with respect to the receiving coil 14, however, the number of flux lines cut by the receiving coil 14 is so small that only a negligible AC signal can be generated. (In this regard, $H_s$ vectors coincident with the magnetic axis of the receiving coil 14 is depicted in FIG. 2 to signify the directions of resultant magnetic field which would induce, alternatively, maximum AC signals within the receiving coil 14). Even when the earth's field intersects both planes of the receiving and polarizing coils at more intermediate angles than those shown in FIGS. 1 and 2, the character of the AC signal developed in the receiving coils is usually still not sufficient to provide the information desired from nuclear magnetism logging. Although the number of flux lines cut by the coil may be larger than when the earth's field is orthogonal to the plane of the receiving coil as shown in FIG. 2, the developed AC signals are still of such poor quality that no meaningful interpretations can be made.

FIG. 3 illustrates a nuclear magnetism well logging apparatus capable of operation within equatorial regions of the world or in slanted boreholes suffering from a similar magnetic field effect. Earth formation 10 is seen to be penetrated by wellbore 11. Within wellbore 11 is logging sonde 12. Within sonde 12 are positioned polarizing coil 13 and receiving coil 14. Logging sonde 12 is raised and lowered within the borehole 11 by means of a logging cable 15 drawn by rotation of pulley 16 mounted to fixed mount 16a. Within logging sonde 12 is also positioned a switch-decay control circuit 17. Circuit 17 is connected uphole to timing controller 18 as well as to controlled power supplies 19 and 20 by electrical leads 21. Polarizing coil 13 within the sonde 12 is connected electrically to the switch-decay circuit 17 by electrical conductors 22 and 23. Receiving coil 14 is also controllably connected to the switch-decay circuit 17 as by conductor 24. As explained in more detail below, receiving coil 14 can be operatively connected via the switch-decay control circuit 17 uphole to either control power supply 20 or via receiving circuit 25. Receiving circuit 25 connects uphole through amplifier 26 to galvanometer-pen unit 27 forming a part of a recording system generally indicated at 28. AC-voltage induced into the receiving coil 14 is recorded as a function of time on chart 33. Current-versus-time waveforms of the controlled power supplies 19 and 20 can also be recorded in parallel format with the AC-voltage, as provided by galvanometer-pen units 29 and 30 connected to the supplies 19 and 20 via conductors 31.

It is apparent from FIG. 3 that the amplitude of the current supplied by the controlled power supplies 19 and 20 can be continuously monitored by an operator measuring the character of the waveforms of the traces produced by galvanometer-pen units 29 and 30. In this regard, the current supplied to receiving coil 14 is considerably weaker than the current supplied to polarizing coil 13; however, the waveforms of the current provided by galvanometer-pen units 29 and 30 do not clearly specify the differential that in actual practice exists. In this regard, the current from controlled power supply 19 produces a polarizing field $H_p$ which may be roughly 10 times greater than a field $H_t$ produced by power supply 20 passing current through receiving coil 14. Since the magnetic axes of the coils 13 and 14 are orthogonal to each other over a major portion of the formation under influence thereof, the $H_t$ and $H_p$ fields are at 90° to each other. Chart 33 is connected to pulley 16 so that depth generator 34 is capable of maintaining an accurate depth record along the edge of the chart 33. By combining the known time sequence programmed into timing controller 18, and having a knowledge of the waveform character produced by the galvanometer-pen unit 27, it is possible to determine the free fluid index of the formation fluids surrounding the sonde or the presence of oil and water in the formation adjacent to the wellbore.

The receiving coil 14 does not remain coupled to amplifier 26 throughout the entire logging cycle, however. As will be explained in more detail below, during a portion of the logging cycle, the receiving coil 14 is decoupled by operation of switch-decay control circuit 17 from receiving circuit 25 and then coupled via conductors 21 uphole to power supply 20.

FIGS. 4a and 4b show quantatively a preferred method in which control of the magnitude of the polarizing field $H_p$ is provided to form the method of the present invention. The height $H_p$, $H_e$ and $H_1$ of these figures represent field strengths of magnetic fields at a selected radial distance from the wellbore. In more particular detail, the height $H_p$ refers to the field strength of the polarizing field produced by the polarizing coil 13, $H_e$ refers to the earth's magnetic field strength, while $H_t$ refers to the strength of the magnetic field produced by passing current through the receiving coil 14. Horizontal distance along the figures represent time indicated by $T_o$, $T_1$, etc. In each figure, a time is marked by $\tau=0$ when precession of protons in the formation fluids commences.

In carrying out the method of the present invention, selective programming in the occurrence of these fields is of major importance. Accordingly, certain time periods during the logging cycle should be mentioned. The time period $T_{pc}$ represents the time of current flow in the polarizing coil; the time period $T_D$ represents the decay period after the polarizing coil has been disconnected at time $T_A$, the current expendentially decreasing in value, as shown; and $T_{rc}$ represents the time period of current flow in the receiving coil. In this regard, the decay time period $T_D$ is seen to begin before the time period $T_{rc}$ has, indeed, begun and falls to substantially zero at time $T_4$.

The shape of curves depicted in FIGS. 4a and 4b are also of importance. Since the waveform of the polarizing current decays exponentially, the generated $H_p$ field can be expected to collapse at a similar rate. If the collapse is in the presence of a rather weak but constant polarizing field $H_l$ which at many formation locations is 90° thereto, an adiabatic change in the direction of the resultant magnetic field therebetween can occur in which the polarization M will turn in a following wake of the shifting resultant field. By the term "adiabatic," it is meant that if the polarization M is subjected to a resultant magnetic field and that field is angularly rotated at a rate that is small compared to the Larmor precessional rate in the $H_r$ field, then the polarization M will also turn with the angular shifting of the resultant field. Accordingly, if before the change in direction of the resultant field, the polarization M was precessing about a field at a certain angle, then after an adiabatic change in direction of the resultant field, then the polarization M will still precess about the new field at the same angle. The requirement that the $H_p$ field be collapsed slowly is indicated by the curved line of FIG. 4a. However, at $\tau=0$, the $H_l$ must be collapsed suddenly. This requirement is indicated by the square lines of FIG. 4b. If the rate is $10^5$ gauss per second or more at the time the $H_l$ field is about equal to the earth's field $H_e$, then the polarization M is unable to follow the change in direction of the resultant field since the resultant magnetic field is turning at an angular rate much greater than the value of the Larmor frequency of protons in the earth's field. Such a change is termed a sudden change in direction of the magnetic field.

When it is desired to reduce the $H_p$ field adiabatically, it is necessary to change that field by not more than the strength of the $H_l$ field in a time which is equal to several cycles of precession in the $H_l$ field. If the $H_l$ field is about 10 gauss at a selected point in the formation, then precession frequency in the $H_l$ field at that point is about 40,000 Hertz. Thus the $H_p$ field should be changed at a rate less than about 400,000 gauss per second over the time period that the $H_p$ and $H_l$ fields are about equal.

Figure 5:
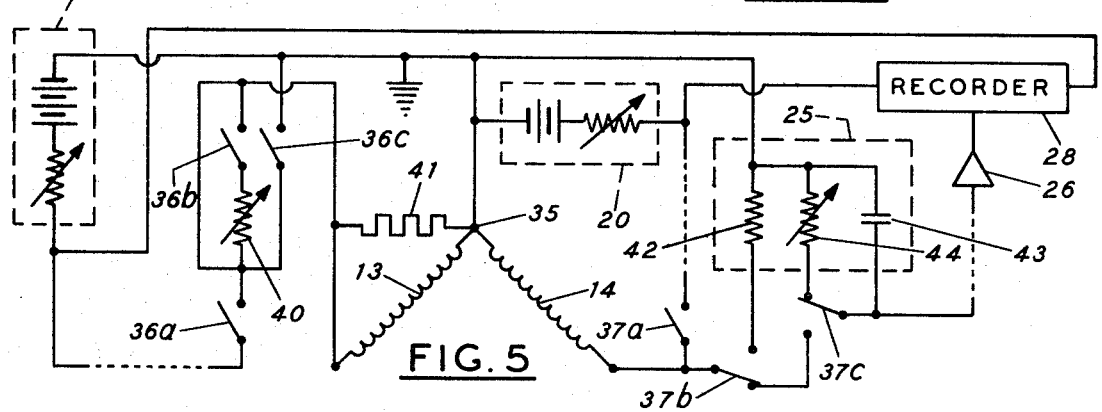
FIGS. 5 and 6 are circuit schematics for obtaining the waveforms of FIGS. 4a and 4b.
Figure 6:
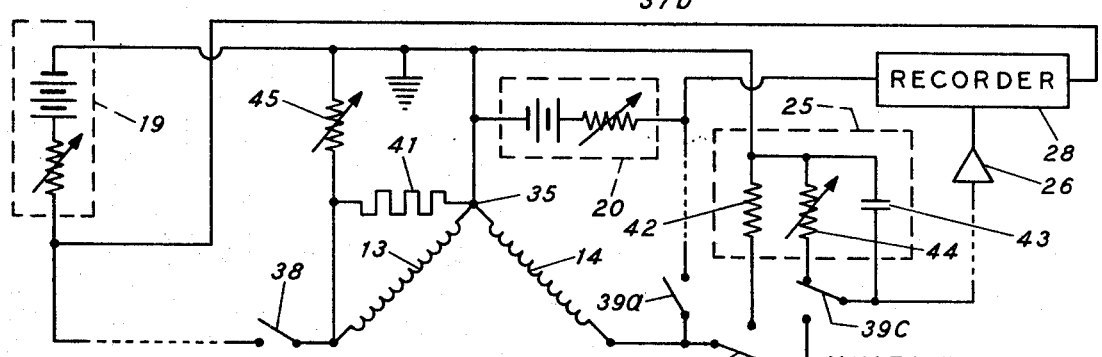

FIGS. 5 and 6 illustrate circuitry for providing the magnetic field pattern of FIGS. 4a and 4b. In each figure, there are substantially two separate circuits — to the left of point 35 is a circuit for generating the polarizing field Hp; to the right of point 35 is circuitry for sequentially generating the weak magnetic field $H_l$ as well as for detecting AC-voltage precession signals. Timing controller 18 of FIG. 3 has been omitted since the construction of suitable timing circuits is a routine procedure for one skilled in the art. Although the timing controller is not illustrated, it is apparent that all relay switches shown are operated on a programmed sequence through the generation of appropriate electrical signals therefrom. In this regard all relay switches shown such as electrical relay switches 36a, 36b, 36c, 37a, 37b and 37c of FIG. 5 and switches 38, 39a, 39b and 39c of FIG. 6 operate under programmed instructions from the timing controller in the manner set forth hereinafter. In describing operations of the circuitry depicted in FIGS. 5 and 6, reference should also be had to the field waveforms illustrated in FIGS. 4a and 4b.

FIGS. 4a and 5: after the sonde is positioned within the wellbore, assume all relays are open, in the positions shown in FIG. 5, except for relay 36a. Accordingly, current from polarizing coil 19 will pass to the polarizing coil 13 to provide the desired polarizing field $H_p$ within the formation. At the end of the polarizing period $T_{pc}$, relay 36a is opened simultaneously with the closing of relays 36b and 36c to establish a parallel R-L circuit to ground, such R-L circuit comprising resistor 40 and polarizing coil 13. During the polarizing period, relays 37b and 37c are open as shown so that the receiving circuit 25 is disconnected from amplifier 26. Thyrite resistor 41 limits the voltage developed across the polarizing coil 13 when various switches are open. It does not, however, interfer with the program changes in current that must occur within the coil with time.

FIGS. 4b and 5: After the polarizing period $T_{pc}$ has begun, but before it is ended, relay 37a normally open is closed connecting the receiving coil 14 to the controlled power supply 20. At the end of $T_{Rc}$, the relay 37a is opened. Simultaneously relay 37b is energized to connect the receiving coil 14 to dampening resistor 42. This prevents transient currents from occuring in the receiving coil which could interfere with the "sudden" removal of the $H_l$ field at time $\tau=0$. Thereafter, the relay 37b is de-energized as relay 37c is energized. Energizing relay 37c connects proton precession receiving circuit 25 to the receiving coil 14 at a few moments after $\tau=0$. The resulting AC-voltage signal quickly builds up in the resonant circuit comprising coil 14, tuning capacitor 43 and resistor 44; these signals pass through amplifier 26 to receiving system 28.

FIGS. 4a and 6: As relay 38 is closed, polarizing current flows from controlled power supply 19 to the polarizing coil 13. At the end of the polarizing period $T_{pc}$, relay 38 is deenergized, simultaneously establishing a parallel R-L circuit with respect to ground, the parallel R-L circuit comprising resistor 45 and polarizing coil 13.

FIGS. 4b and 6: At logging times previously illustrated and described, controlled power supply 20 is connected to receiving coil 14 by the closure of relay 39a. At the end of the time period $T_{RC}$, the resulting magnetic field $H_l$ is terminated by the opening of the relay 39a. Operation of relays 39b and 39c are similar to those previously described in relation to relays 37b and 37c of FIG. 5. As a result of their operation, AC-voltage signals quickly build up, pass through amplifier 26 to recording system 28.

CONSTRUCTIONS ON COILS 13 AND 14.

Figure 7B:
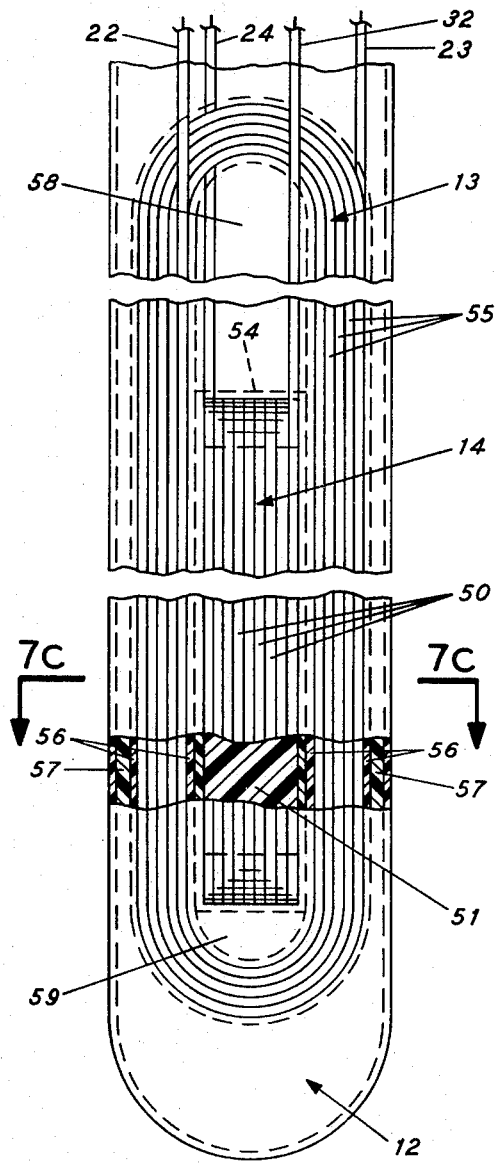
FIG. 7b is a side view of the crossed-coil system of the present invention illustrating an end view of the receiving coil and a side view of the polarizing coil.
Figure 7C:
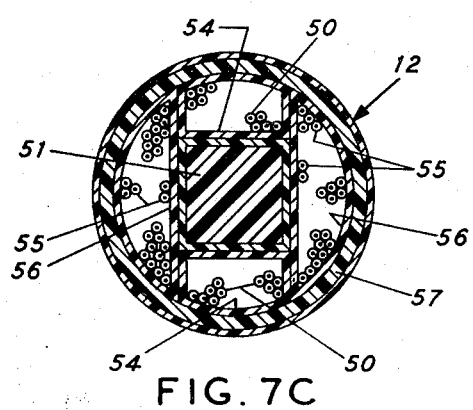
FIG. 7c is a section taken along line 7c—7c of FIG. 7b illustrating the manner in which the polarizing and receiving coils are longitudinally wound about a central core.
Figure 7A:
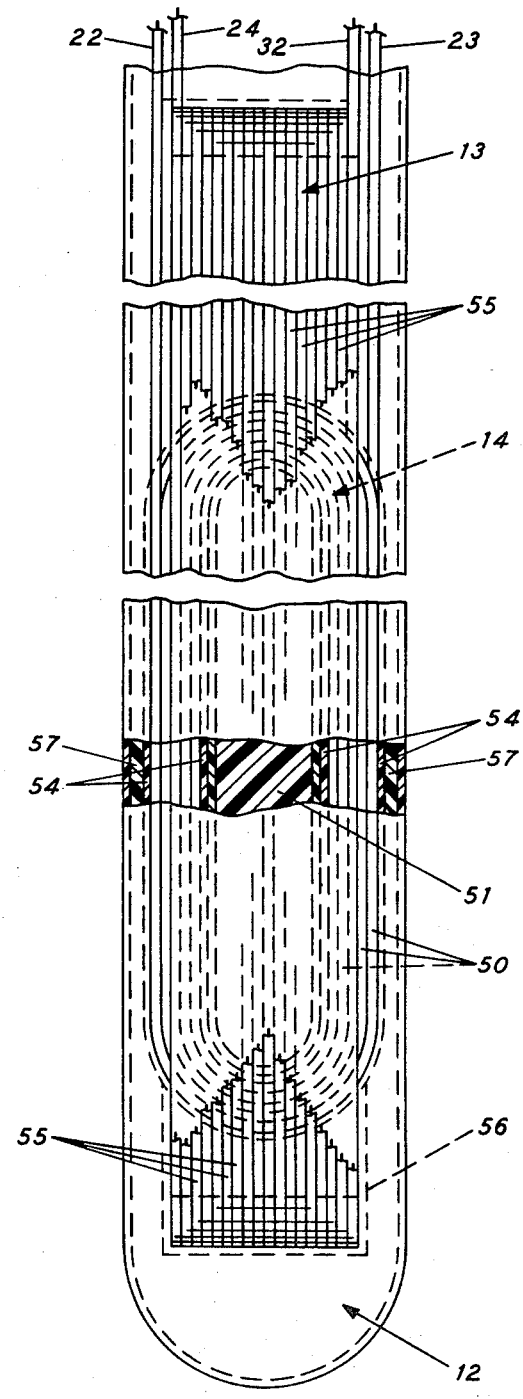
FIG. 7a is the frontal view of the crossed-coil of the present invention illustrating an end of the polarizing coil in a side view of the receiving coil.

Referring now to FIG. 7a, it can be seen that windings 50 of receiving coil 14 have been wound around central nonmagnetic core 51. Shroud 54 encloses receiving coil 14 to protect the windings and to maintain the shape of the coil. At right angles to the plane of the receiving coil and around its exterior, are windings 55 of polarizing coil 13. A second shroud 56 encloses the polarizing coil 13 to protect its configuration. It is evident that the upper portion of the polarizing coil extends above the upper end of receiving coil, as shown in FIG. 7a, and that the lower end of the polarizing coil extends slightly below the lower end of receiving coil. In that way, logging can be carried out at increased borehole speeds as taught in U.S. Pat. No. 3,402,343 previously mentioned.

As is evident in FIGS. 7a and 7b, receiving coil 14 terminates in leads 24 and 32 and polarizing coil 13 terminates in leads 22 and 23. These leads are fed into the logging cable 15 of FIG. 3 attached to logging sonde 12. Logging sonde 12 is constructed of a thin shroud into which the crossed coils are placed. When the crossed coils are in place a nonmagnetic firm filler material 57 such as a thermoplastic polymer is introduced to the interior of the sonde to insure that the coils are not jostled out of alignment by movement of the sonde in the borehole. Inserts 58 and 59 similarly serve to maintain the receiving coil in a fixed position with respect to the polarizing coil.

In FIG. 7c the construction of the crossed coils is illustrated. Shroud 54 for receiving coil 14 is seen to enclose windings 50 of the receiving coil to maintain its shape. Second shroud 56 for the polarizing coil is seen to enclose windings 55 of the polarizing coil to maintain its shape. Firm filler material 57 such as a thermoplastic polymer is shown to surround shrouds 54 and 56 and to fill the void between these shrouds and the shell of the logging sonde 12.

RESUME

In conclusion, it is understood that the present invention relates to important discoveries in nuclear magnetism logging within earth formations located in magnetically-equatorial regions of the world. As previously explained, polarizing field $H_p$ is first established by passing a polarizing current to a polarizing coil having a magnetic axis orthogonal to that of the receiving coil. After the $H_p$ field has reached a steady state, a weak current is established in the receiving coil to generate a weak magnetic field $H_l$. When $H_l$ has reached a steady state, $H_p$ field is cut off in an adiabatic manner. The resultant instantaneous magnetic field $H_r$ formed by the $H_l$ and collapsing $H_p$ fields will angularly shift prior to proton precession about the earth's magnetic field. As a resultant magnetic field $H_r$ rotates, the polarization M acquired by the protons rotates in its wake. The magnetic field $H_l$ induced by the polarization M, also rotates to assume a new magnetic pattern prior to precession of the protons. The magnetic field $H_l$ induced by the polarization M will appear, after rotation, to have been generated by a large polarizing field emanating from the receiving coil. As precession occurs, the induced magnetic field $H_l$ is also coupled effectively to the receiving coil.

Criterion to be followed in determining the exponential rate of cut-off of the polarizing field $H_p$ in the presence of the weak magnetic field $H_l$ is that the rotation of the resultant magnetic field $H_r$ should be adiabatic. Also, the magnitude of the weak magnetic field $H_l$ should be at least twice but preferably four or five times the earth's magnetic field at a radial point within the formation signifying the maximum distance with respect to the wellbore that nuclear magnetic signals can be generated and detected. Criterion to be followed in cutting off of the weak magnetic field $H_l$ is that the cut-off be sudden. Transient effects rendered by the cut-off of $H_l$ should not be allowed to interfer with the subsequent measurement of the induced AC-voltages in the receiving coil.

While specific embodiments have been presented in this specification and drawings, it is evident that many embodiments of the method and apparatus of the present invention are feasible and it it intended that the Letters Patent covering the invention herein be limited only to the scope and spirit of the appended claims:

What is claimed is:

1. In a cross coiled nuclear magnetism logging sonde for detecting in an earth formation penetrated by a well bore the presence of formation fluids through generation and detection of nuclear magnetic signals from protons of said formation fluid, by alignment of said protons into a first direction by means of a rather strong polarizing field $H_P$ whereby said protons acquire a nuclear polarization M, interrupting a said polarizing field $H_P$ and, as said protons and said acquired polarization M precesses about the earth's magnetic field, detecting said protons as relaxation into alignment with said earth field occurs, the improvement for providing more effective nuclear magnetism logging results in earth formations in magnetically equatorial regions of the world or in slanted boreholes in which the earth's magnetic field is substantially perpendicular to the borehole axis, comprising:

a. separate crossed coil polarizing and receiving coil means housed within said sonde having substantially perpendicular magnetic axis with respect to each other, b. means for cyclically connecting current source means and proton precession detection means relative to said polarizing and receiving coils so as to generate and detect nuclear magnetism signals of said formation protons, c. said cyclically connecting means including interrupt and current control means connected to said coil means for generating, in addition to said strong polarizing field $H_P$, a separate polarizing field $H_l$ overlapping in time and space with respect to said strong polarizing field $H_P$ but being of substantially different resultant direction therefrom for angularly and adiabatically shifting with respect to the earth's field said polarization M to more effective directions prior to their precession about the earth's field.

2. The improvement of claim 1 in which said interrupt and current control means includes switch means connecting said current source means to said polarizing coil as well as selectively connecting said current source means relative to said receiving coil to generate said polarizing field $H_l$ of a rather weak magnitude and thereafter, for selectively disconnecting said current source means from said polarizing coil means after said weak polarizing field $H_l$ is produced thereby terminating the generation of said strong $H_P$ polarizing field in the presence of said weak polarizing field $H_l$.

3. The improvement of claim 2 in which said interrupt and current control means includes damping resistor means selectively connected between said current source means and said polarizing coil means to control the rate of collapse of said polarizing field $H_P$ in the presence of said weak polarizing field $H_l$ whereby a resultant magnetic field $H_r$ formed therefrom is caused to rotate at a rate which is small compared to the Larmor frequency of protons in said $H_r$ field.

4. Apparatus for conducting cross-coil nuclear magnetism logging in an earth formation in which the earth's magnetic field is substantially perpendicular to the axis of a borehole penetrating said formation wherein nuclear magnetism polarization M acquired by polarized protons of fluids in said earth formation is manipulated prior to precession about the earth's magnetic field to more effectively indicate the presence of said precessing protons, comprising:
   a. a polarizing coil having a first magnetic axis, in selective and cyclic electrical communication for a first time period with a source means of electrical current to generate a polarizing magnetic field $H_P$ whereby protons in said formation adjacent to said polarizing coil are polarized and acquire said polarization M,
   b. a receiving coil adjacent to said polarizing coil having a second magnetic axis substantially perpendicular to said first magnetic axis in selective electric communication for a second time period with said source means of electrical current to generate a rather weak magnetic field $H_l$, said second time period commencing before and terminating after termination of said first time period producing an overlapping time increment of relatively short time duration, said receiving coil also being in selective contact with a proton precessing detection means during a third time period to detect precession of said protons about the earth's field,
   c. means for controllably connecting said receiving and polarizing coils relative to said current source means and said proton precession detection means during said first, second and third time periods,
   d. said last-mentioned means including interrupt and current control means for controllably connecting said current source means relative to said receiving and polarizing coils during said overlapping time increment whereby said polarization M acquired by said formation protons is angularly and adiabatically shifted with respect to the earth's field to more effective directions prior to precession about the earth's field.

5. The improvement of claim 3 in which said dampening resistor means and said polarizing coil form a parallel R-L circuit with respect to ground whereby polarizing current through said polarizing coil decays exponentially with time.

6. Apparatus of claim 4 in which said interrupt and current control means includes dampening resistor means selectively connected between said current source means and said polarizing coil to control the rate of collapse of said polarizing field $H_P$ in the presence of said weak polarizing field $H_l$ whereby a resultant magnetic field $H_r$ formed therefrom is caused to rotate at a rate which is small compared to the Larmor frequency of protons in said $H_r$ field.

7. Apparatus of claim 6 in which said dampening resistor means and said polarizing coil form a parallel R-L circuit with respect to ground whereby polarizing current through said polarizing coil decays exponentially with time.

8. Apparatus for conducting crossed-coil nuclear magnetism logging of claim 4 in which said polarizing and receiving coils each have a substantially rectangular shape defining a longitudinal axis substantially parallel to said borehole axis but each of said first and second magnetic axes being substantially perpendicular to said borehole axis and to each other.

9. Apparatus of claim 8 wherein said substantially rectangular polarizing coil has a greater effective length within said sonde than said substantially rectangular receiving coil, the differential length of said polarizing coil extending in the direction in which the sonde is logged to permit the protons along successive sections of said formation to be effectively polarized before arrival of said receiving coil.

10. In a method for detecting in an earth formation penetrated by a well bore the presence of formation fluids through generation and detection of nuclear magnetic signals from protons of said formation fluid, by alignment of said protons into a first direction by means of a rather strong polarizing field $H_P$ whereby said protons acquire a nuclear polarization M, interrupting said polarizing field $H_P$ and, as said protons and said acquired polarization M precesses about the earth's magnetic field, detecting said protons as relaxation into alignment with said earth field occurs, the improvement for providing more effective nuclear magnetism logging results in earth formations in magnetically-equatorial regions of the world or in slanted boreholes in which the earth's magnetic field is substantially perpendicular to the borehole axis which comprises:
   a. positioning separate cross-oriented polarizing and receiving coils in said borehole adjacent to a longitudinal region of said earth formation so that respective magnetic axes of said coils are substantially perpendicular to each other,
   b. applying polarizing current to said polarizing coil for a first time period to generate said magnetic field $H_P$ so that protons within said region of formation are polarized and acquire said polarization M,
   c. applying a weak current to said receiving coil to produce a weak magnetic field, $H_l$, for a second time period,
   d. controlling said first and second time periods so that said second period commences before and terminates after said first time period to define an overlapping time increment of relatively short time duration,
   e. controlling during said overlapping time increment cut-off of said polarizing current and hence collapse of said polarizing field $H_P$ in the presence of said weak magnetic field $H_r$ whereby said polarization M acquired by said formation protons is angularly and adiabatically shifted with respect to the earth's field to more effective directions prior to precession about the earth's field, and f. after said second time period has terminated, connecting said receiving coil to a proton precessing detection means for a third time period to detect the precessing protons.

11. The method of claim 10 in which the cut-off of said polarizing current in step (e) and hence the rate of collapse of said polarizing field $H_P$ is such that a resultant magnetic field $H_r$ formed from said polarizing fields $H_P$ and $H_l$ is angularly shifted at a rate less than the Larmor frequency of protons in the $H_r$ field.

12. The method of claim 11 in which the cut-off is exponential with time.

* * * * *